(12) United States Patent
Evje

(10) Patent No.: US 9,588,600 B2
(45) Date of Patent: Mar. 7, 2017

(54) ERGONOMIC COMPUTER MOUSE

(71) Applicant: Eivind Evje, Oppegaard (NO)

(72) Inventor: Eivind Evje, Oppegaard (NO)

( * ) Notice: Subject to any disclaimer, the term of this patent is extended or adjusted under 35 U.S.C. 154(b) by 123 days.

(21) Appl. No.: 14/430,228

(22) PCT Filed: Oct. 3, 2013

(86) PCT No.: PCT/NO2013/050167
§ 371 (c)(1),
(2) Date: Mar. 22, 2015

(87) PCT Pub. No.: WO2014/054952
PCT Pub. Date: Apr. 10, 2014

(65) Prior Publication Data
US 2015/0268741 A1    Sep. 24, 2015

(30) Foreign Application Priority Data

Oct. 5, 2012 (NO) .................................... 20121131

(51) Int. Cl.
*G06F 3/0354* (2013.01)
*G06F 3/033* (2013.01)
*G06F 3/0362* (2013.01)

(52) U.S. Cl.
CPC .......... *G06F 3/03543* (2013.01); *G06F 3/033* (2013.01); *G06F 3/0362* (2013.01); *G06F 2203/0332* (2013.01); *G06F 2203/0333* (2013.01)

(58) Field of Classification Search
CPC ................................ G06F 3/033; G06F 21/83
See application file for complete search history.

(56) References Cited

U.S. PATENT DOCUMENTS

| 4,862,165 A | * | 8/1989 | Gart .................... G06F 3/03543 341/20 |
| D374,867 S | * | 10/1996 | Canavan ..................... D14/417 |
| 6,072,471 A | | 6/2000 | Lo |
| 6,292,175 B1 | | 9/2001 | Sheehan |
| 6,300,941 B1 | * | 10/2001 | Segalle ............... G06F 3/03543 345/163 |
| 6,377,245 B1 | | 4/2002 | Park |
| 6,396,479 B2 | | 5/2002 | Gordon |

(Continued)

FOREIGN PATENT DOCUMENTS

| CN | WO 2006042476 A1 | * 4/2006 | ......... G06F 3/03543 |
| GB | 2472880 | 2/2011 | |

(Continued)

*Primary Examiner* — Priyank Shah
(74) *Attorney, Agent, or Firm* — Steinberg Intellectual Property Law LLC; Gloria M. Steinberg, Esq.

(57) ABSTRACT

Computer mouse for operation of functions when using a computer, comprising a housing (10), and three control means in the form of a primary mouse button (12), a secondary mouse button (14) and a scroll means (16). The primary (12) and secondary mouse button (14) and scroll means (16) is being so arranged interrelated that the primary mouse button (12) is located between the scroll means (16) and the secondary mouse button (14). The secondary mouse button is preferably substantially vertically placed and made of a material or coated with a coating that gives increased friction.

9 Claims, 3 Drawing Sheets

(56) References Cited

U.S. PATENT DOCUMENTS

| | | | |
|---|---|---|---|
| 6,545,665 B2 * | 4/2003 | Rodgers | G06F 3/03543 345/157 |
| 6,556,150 B1 * | 4/2003 | McLoone | G06F 3/03549 341/20 |
| 6,664,947 B1 * | 12/2003 | Vinogradov | G06F 3/03543 345/157 |
| 6,781,573 B1 * | 8/2004 | Honma | G06F 3/03543 345/157 |
| 6,795,058 B2 | 9/2004 | Gordon | |
| 7,212,191 B2 * | 5/2007 | Snijders | G06F 3/03543 345/156 |
| 8,098,229 B2 | 1/2012 | Snijders | |
| 8,314,772 B1 * | 11/2012 | Coe | G06F 3/03543 345/163 |
| 2001/0022578 A1 * | 9/2001 | Giles | G06F 3/03543 345/163 |
| 2006/0007145 A1 * | 1/2006 | Naghi | G06F 3/03543 345/163 |
| 2006/0125791 A1 | 6/2006 | Lian | |

FOREIGN PATENT DOCUMENTS

| | | |
|---|---|---|
| WO | 2006042476 A1 | 4/2006 |
| WO | 2011023951 A9 | 1/2012 |

* cited by examiner

ERGONOMIC COMPUTER MOUSE

This invention relates to an ergonomic computer input device, hereinafter termed computer mouse, for controlling a visual pointer on a screen etc. forming part of a user interface and for activation of choice in software as visualized on a display Computer Mice is widely used as computer input devices, but prolonged use can often lead to pain and tendinitis in the wrist, forearm, upper arm or shoulder. At constant use, the hand and arm are exposed to many small strains on ligaments and tendons, each of which is insignificant, but which together exceed the tissue tolerance. The result is development of pain and possible injury to the ligaments or tendons.

The most commonly used computer mouse principle has two buttons on the front and a scroll wheel in the middle, such as displayed in U.S. Pat. No. 6,097,371. Prolonged use of this combination is often associated with pain and tendonitis partly due to the user's continuous lifting of the middle finger. Many users must lift the middle finger to avoid involuntary clicking of the right mouse button. What is positive with this type of mouse is that it allows the user's wrist to rest on the table, enabling only the hand and fingers to move the mouse. Then the whole arm is kept still during operating the mouse, and is experiencing minimal strain.

There have been many attempts to develop alternative mouse solutions providing minimal strain to hand and arm during use. Examples are given below.

A fairly common alternative to the computer mouse is a so-called joystick mouse that you hold like a vertical rod, and with buttons accessible for the fingers. The rod can be moved in all horizontal directions, and thus controls the Cursor movement. An example is 3M Ergonomic Mouse. The problem with this type of device is that the large muscles of the forearm are used to move the stick. These muscles are not suitable for precision movement and, consequently, the user will experience poorer cursor precision with a joystick than with a conventional finger-operated mouse. Another drawback of joystick mouse is the continuous strain on the muscles of the forearm during prolonged use.

Other solutions are known from U.S. Pat. Nos. 6,396,479 and 6,795,058. These solutions have a placement of the right mouse button that eliminates the need for lifting the middle finger. They have not, however, a scroll function, and the user must use an unnecessary amount of time and effort to scroll by dragging the computer mouse down the scroll bar in the computer program that is being used.

U.S. Pat. No. 6,292,175b shows a solution with a so-called "trackball" where the "mouse" is stationary and the pointer is moved by rolling a ball with a finger (the thumb in this case). Intensive use of computer mice can consist of almost continuous precision cursor movement, combined with clicking the buttons. Using one finger on the ball until all the movement of the pointer can cause much stress and damage to tendons and muscles related to that finger.

U.S. Pat. No. 6,072,471 shows a computer mouse that provides a relaxed hand position when holding it, but during use one must use the whole arm to move the mouse back and forth in the length direction of the arm, because the hand is angled in a way that it prevents the fingers to perform this direction movement. Moreover, it is not a good lift grip for the mouse so that the user can easily lift it to reposition the cursor. Such lifting is done often 1-2 times per minute during active use of the mouse, and if this is an operation that requires one to squeeze the mouse a bit to get it lifted, it leads easily to strain after prolonged use. In this mouse you have to pinch little finger and thumb together to lift the mouse. Then all the needed force is put on those fingers. The other fingers can not squeeze the mouse without unwanted button click.

U.S. Pat. No. 8,098,229 describes a computer mouse that provides a relaxed state for the hand when the hand is laying on it, but during use, one have to move the whole arm to move the mouse. The reason for this is that the wrist is not resting on the table, but at the back of the mouse body. Continuous precision movement of the arm will gradually lead to injuries in either forearm or upper arm or shoulder.

GB Patent No. 2,472,880 describes a computer mouse that is small and easy to maneuver with the fingers, but the mouse buttons positioned above each other. When operating the mouse, the index and middle finger must be continuously held in position on their associated buttons. Proper grip on the mouse is then index finger on the upper button, and middle finger on the lower button. If the fingers are relaxed from this position they will gradually slide down until they rest on the table or on each other. The index finger is then out of position, and must be lifted up again to hit the upper button. This means that the mouse is causing unnecessary strain on the users hand when the mouse is operated.

One can imagine that prolonged use with this mouse can cause pain in the muscles that lift the index and middle finger in the vertical direction.

WO 2011/023951 describes a point-and-click device for a computer comprising an almost vertically oriented body provided with controls such as button for "left click" and button for "right click" and a scroll wheel. As shown in FIG. 1 of this publication the scroll wheel is placed in a field that represents the button for "right click", i.e. the secondary activation button.

A fairly new feature of the mouse is touch sensitive surfaces (touch mouse).

An example is the Microsoft Touch Mouse. Touch technology itself cannot make a computer mouse more ergonomic. If not used properly, touch technology can even make operation of the mouse difficult. When two functions are assigned to the same area (clicking and scrolling) it requires the user to learn how to give the mouse correct signals to be able to distinguish between functions. The user must also make sure that no fingers involuntarily trigger one of the features, such as the index finger is not being swiped over the scroll area while moving the mouse on the table.

OBJECT

It is an object to provide a computer mouse where it is emphasized to achieve ergonomics that reduces the risk of overloading the muscles and tendons even during prolonged use, so that inflammation and pain can be avoided.

THE PRESENT INVENTION

The above objects are achieved through the computer mouse according to the present invention as defined by claim 1.

The preferred embodiments of the invention are stated in the dependent patent claims.

What is particularly achieved by the computer mouse according to the present invention is that one can hold it with a natural grip and without the need to hold any finger lifted to prevent accidental mouse clicks. The danger of overexertion of certain muscles with resultant pain and possibly tenosynovitis is thus reduced.

The term scroll means is used as a generic term for the scroll wheel and scroll field in the form of a touch-sensitive surface.

FURTHER ON THE PRESENT INVENTION WITH REFERENCE TO THE FIGURES

FIG. 4 shows the computer mouse of FIG. 1 with a user's hand drawn in.

Figure 1:
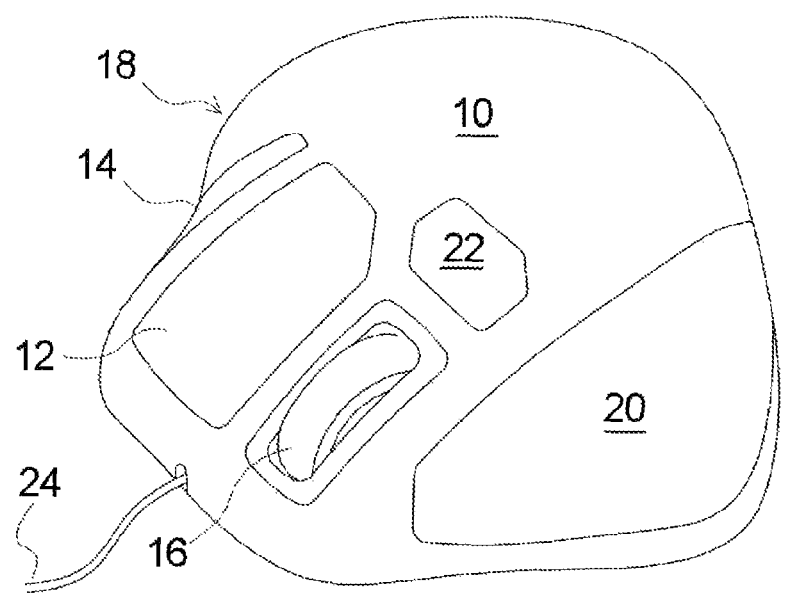
FIG. 1 shows a perspective sketch of a computer mouse according to the present invention.

FIG. 1 shows a computer mouse with a housing or cover 10, a primary mouse button 12, a secondary mouse button 14 and a scroll wheel 16. This is a computer mouse for right-handed use, in which the right index finger is supposed to be placed on the primary (left) mouse button 12 while the right hand middle finger is intended to lay against the secondary mouse button 14. It is characteristic that the primary mouse button 12 is located between the scroll wheel 16 and the secondary mouse button 14. Thereby it is achieved, among other things, that it is short lateral distance between the left and right mouse buttons, allowing the user no need for spreading the fingers, requiring muscle tension. It is also worth noting that the secondary mouse buttons 14 position is located on an approximately vertical surface of the housing 10, allowing the users middle finger not having to be lifted during use.

As shown in FIG. 1 the scroll means 16 is located at the left of the primary (left) mouse button 12 for a right-handed user. For a left-handed user the primary mouse button will be the right mouse button and the secondary mouse button is the left mouse button. The scrolling means will then be located to the right of the primary (right) mouse button.

FIG. 1 also shows a first friction surface 20 intended as grip surface for the user's thumb and a second friction surface 18 intended as grip surface for the user's little finger and ring finger. Without limiting the friction quantitatively the friction fields 18 and 20 has a higher friction against the user's fingers than the housing 10. The friction surfaces 18 and 20 are located at mainly the opposite sides of the computer mouse.

The computer mouse may optionally contain other controls, such as a button 22 for programmable functions and possibly it may comprise a cord 24, but it may also be wireless.

Figure 2:
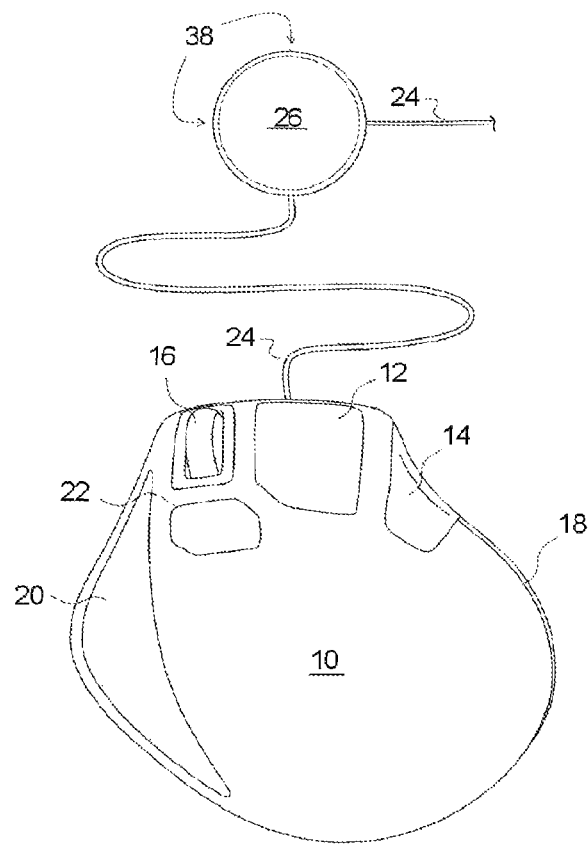
FIG. 2 shows the computer mouse of FIG. 1 seen from above.

FIG. 2 shows the mouse of FIG. 1 seen from another angle. It also displays an optional cable weight 26 on the cord 24.

Figure 3:
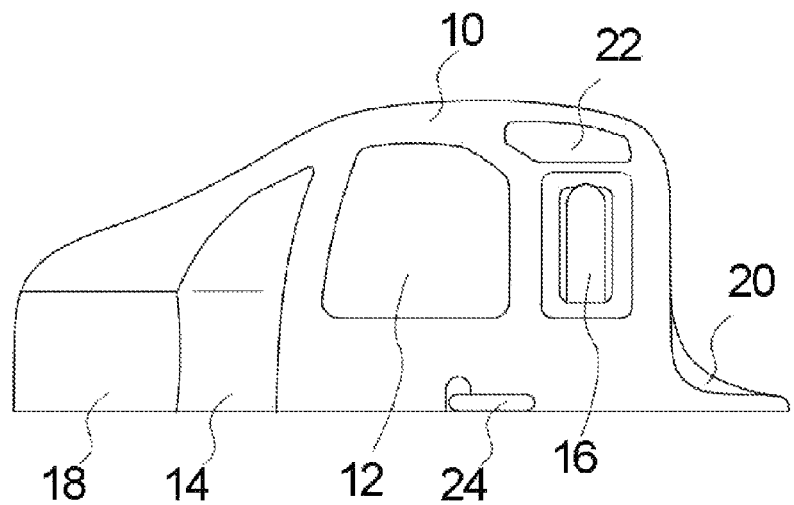
FIG. 3 shows the computer mouse of FIG. 1 seen from the front.

FIG. 3 shows the computer mouse from FIG. 1 from the front. Here it is clearly displayed that the secondary mouse button 14 has an approximately vertical face. The secondary mouse button 14 is typically hinged at the top, so it is the lower part, which is almost vertical, that is being pressed in to activate the selection with this button. In other embodiments, the entire secondary mouse button can be vertical or nearly vertical.

The secondary mouse button 14 is in addition preferably made of or coated with a friction increasing material, i.e. a material which provides good friction against the users finger, i.e. a material that is less slippery than the housing 10 of the mouse will typically be and preferably with the same surface structure as the friction surfaces 18 and 20. Alternatively to the entire mouse button 14 being made of such a material, it can be provided with a layer of a material that provides good friction against the user's finger. "Good friction" is however a subjective term and friction against an individual's finger varies with skin moisture and other parameters in a way it is difficult to quantify with normed numbers. Therefore, it is upon specification of friction used friction between "dead" materials where these sources of variation are largely avoided. The housing 10 of the computer mouse is typically made of a smooth plastic which generally will not have good friction, although under optimal conditions (good temperature/moist fingers) can be easily held in one hand without slipping.

Friction Measurement

As a basis for friction measurements it is used a sheet of anodized aluminum, provided by Alunor AS, Norway with the name "Natural anodized Alucubond E6/EV1."

The friction was measured between the described sheet of anodized aluminum and a preferred type of a friction coating (named "Friction Coating A" in the form of a synthetic TPE rubber (Dryflex 841051-2 provided by Elasto Sweden AB, hardness 75 on the shore A scale). In addition there was measured friction between the described sheet of anodized aluminum and a sheet of hard plastic (ABS) of the type typically used as cover/housing for a computer mouse.

There were made three measurements for each sample and the average measured value is used for the calculation of the coefficient of friction.

| Friction test | | |
| --- | --- | --- |
| Basis material | Test material | Coefficient of friction |
| Natural anodized Alucubond E6/EV | ABS -plastic | 0.27 |
| Natural anodized Alucubond E6/EV | Friction Coating A | 0.47 |

The friction material according to the particularly preferred embodiments of the invention should accordingly have a friction coefficient against anodized aluminum higher than 0.3, more preferably higher than 0.5.

Figure 4:
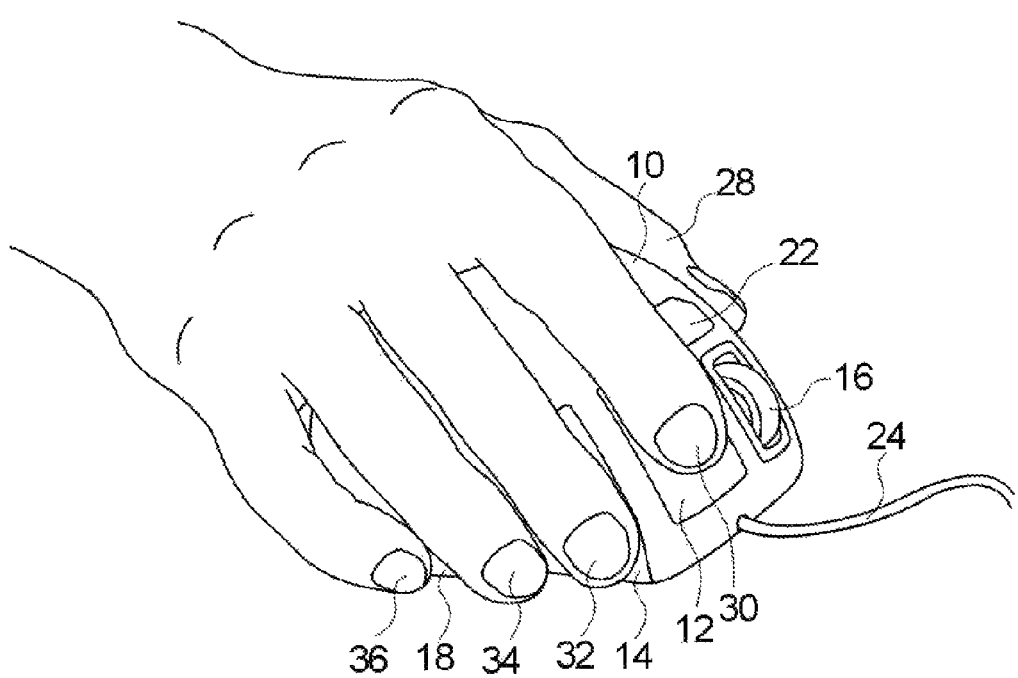

Referring now to FIG. 4, where a hand is shown in a normal use situation of the computer mouse. It appears that the user's index finger 30 and middle finger 32 is fairly close to each other, and especially that the middle finger can be lowered down by the vertical part of the mouse button 14 in a position which allows the muscles and tendons in relation to the user's middle finger rest during normal use of the computer mouse.

It is easy for the user to lift the computer mouse off the desk top/substrate while using it, with a grip of thumb 28 against the first friction surface 20, the grip of the outer part of the little finger 36 and/or ring finger 34 against the friction surface 18 and with careful support of the middle finger 32 against the secondary mouse button 14. The pressure point of the secondary mouse button 14 is so adapted the weight of the computer mouse and the friction thereof against the user's fingers that there is no risk of accidental activation of mouse button 14 when the computer mouse is lifted from the substrate. Since at least portions of the friction surfaces 18 and 20 are vertical or substantially vertical, only a small force is required to lift the computer mouse, and in practice there is required no or very little force from the middle finger toward the secondary mouse button. This can also be expressed as follows: The pressure resistance of the secondary mouse button 14 is so adapted the weight of the computer mouse, the slope of the secondary mouse button 14 and the friction between the finger and the button's surface, that the computer mouse can be lifted while a finger is supported against the secondary mouse button 14 without activation of the mouse button 14.

When operating the scroll wheel of the mouse, the index finger 30 is moved from the primary mouse button 12 to the scroll wheel 16. This is an operation that occurs far less frequently than the operation of the primary mouse button 12. It is therefore an ergonomic gain to let the primary mouse button switch places with the scroll wheel in relation to what is common practice for known types of computer mouse. There is also an ergonomic benefit associated with placing the secondary mouse button 14 so that the user's middle finger can be curved over the computer mouse and down towards the table with the fingers outer joint approximately vertical, unlike other types of computer mice where the middle finger must be fairly straight extensive, since the buttons are arranged on an sloped surface.

Figure 5:
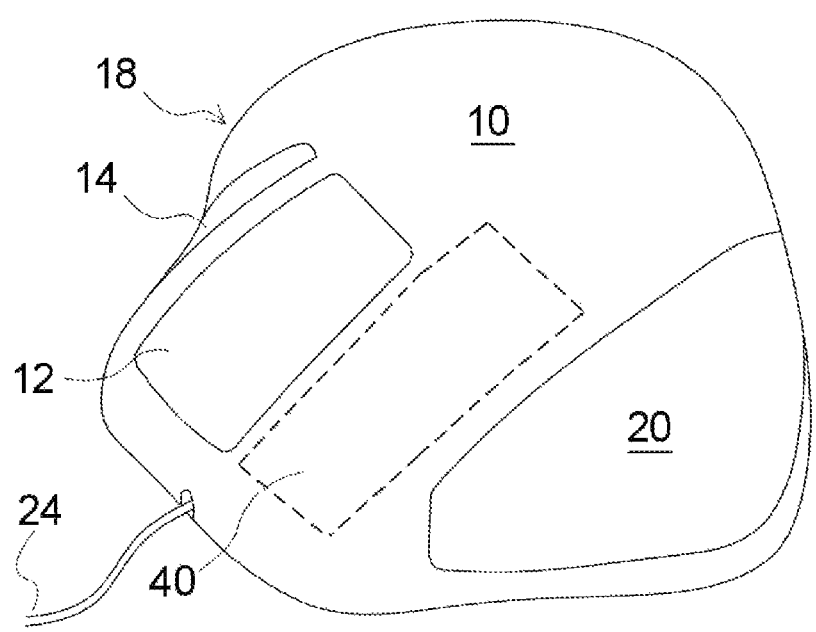
FIG. 5 shows a perspective view of a variant of a computer mouse according to the present invention which differs slightly from the variant shown in FIG. 1.

FIG. 5 shows a computer mouse which only differs from the one shown in FIG. 1 in that the scroll means 16 has the shape of a touch-sensitive field instead of a scroll wheel.

A person skilled in the art will understand that a computer mouse according to the present invention arranged for use with the left hand will be like a mirrored structure with respect to that shown in FIGS. 1-5.

The invention claimed is:

1. A computer mouse for operation of functions when using a computer, comprising a housing (10), and three control means in the form of a primary mouse button (12), a secondary mouse button (14) and a scroll means (16), characterized by an interrelated arrangement so that the primary mouse button (12) is located between the scroll means (16) and the secondary mouse button (14) while the secondary mouse button (14) has an approximately vertical contact surface adapted for being operated in a generally horizontal direction by a middle finger, and the pressure resistance in the secondary mouse button (14) is so adapted to the weight of the mouse, to the sloping of the secondary mouse button (14) and to the friction between the middle finger and the button's surface, that the mouse can be lifted while the middle finger rests against the secondary mouse button (14) without activating the secondary mouse button (14).

2. The computer mouse according to claim 1, characterized by that for a right-handed user, the primary mouse button (12) is a left mouse button and the secondary mouse button (14) is a right mouse button, while the scroll means (16) is to the left of the left mouse button.

3. The computer mouse according to claim 2, characterized by that for a left-handed user the primary mouse button (12) is a right mouse button and the secondary mouse button (14) is a left mouse button, while the scroll means (16) is to the right of the right mouse button.

4. The computer mouse according to claim 1, characterized by that the secondary mouse button (14) is adapted to be used with the middle finger.

5. The computer mouse according to claim 1, characterized by that it comprises at least one friction surface (18) in a material that exhibits higher friction than the housing (10).

6. The computer mouse according to claim 1, characterized by that it comprises two friction surfaces (18, 20) in a material that exhibits higher friction than the housing (10).

7. The computer mouse according to claim 6, characterized by that the two friction surfaces (18, 20) are arranged on a substantially opposite surfaces of the computer mouse.

8. The computer mouse according to claim 6, characterized by that the secondary mouse button (14) has a surface of a friction increasing material.

9. The computer mouse according to claim 8 characterized by that the two friction surfaces (18, 20) and the friction increasing material on the secondary mouse button (14) is made of a material with a static coefficient of friction greater than 0.3 against a surface of naturally anodized aluminum.

* * * * *